R. J. DAVIDSON.
ROTARY ENGINE.
APPLICATION FILED MAR. 4, 1910.
1,078,539.
Patented Nov. 11, 1913.
2 SHEETS—SHEET 1.
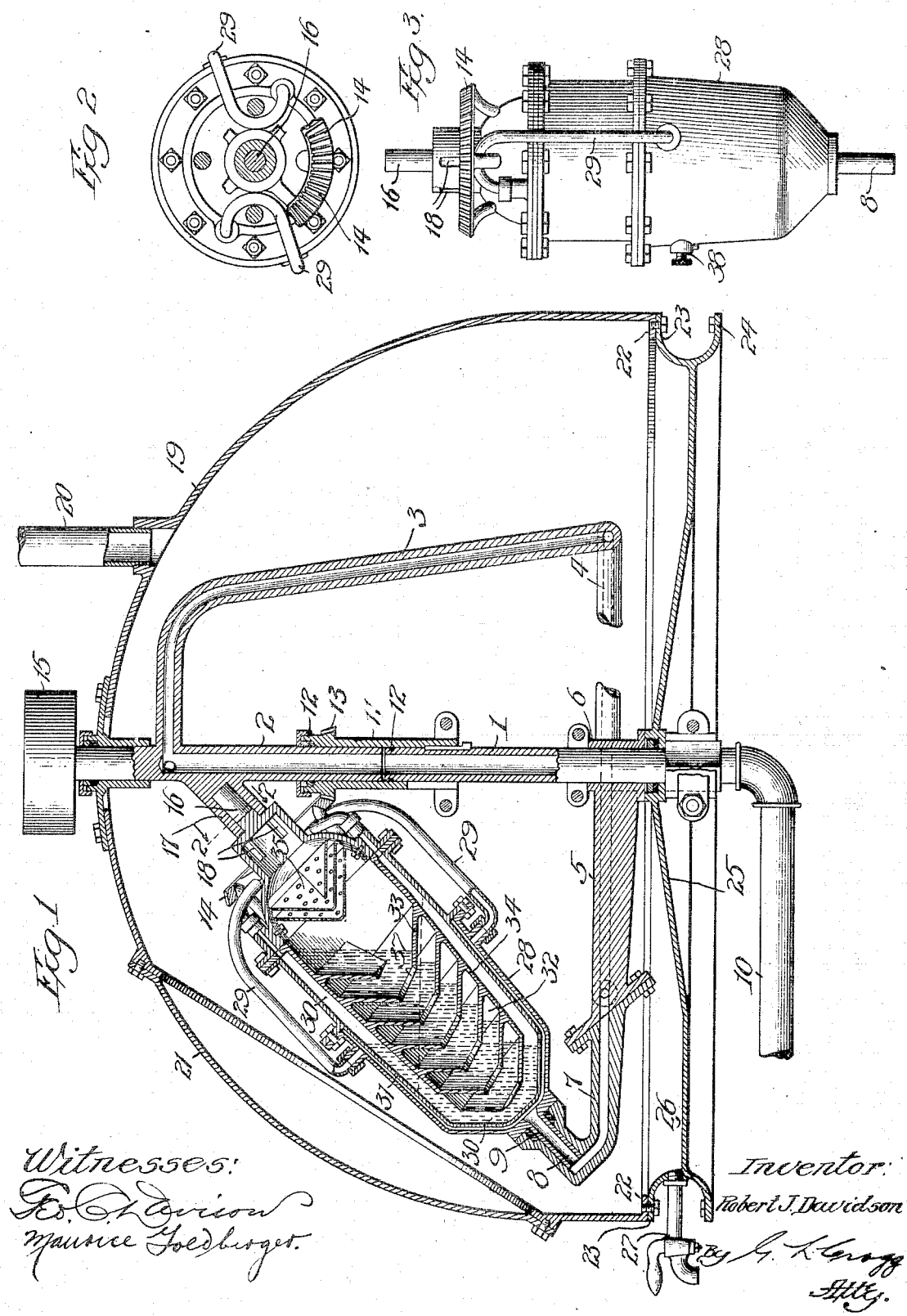
Witnesses:
Inventor:
Robert J. Davidson

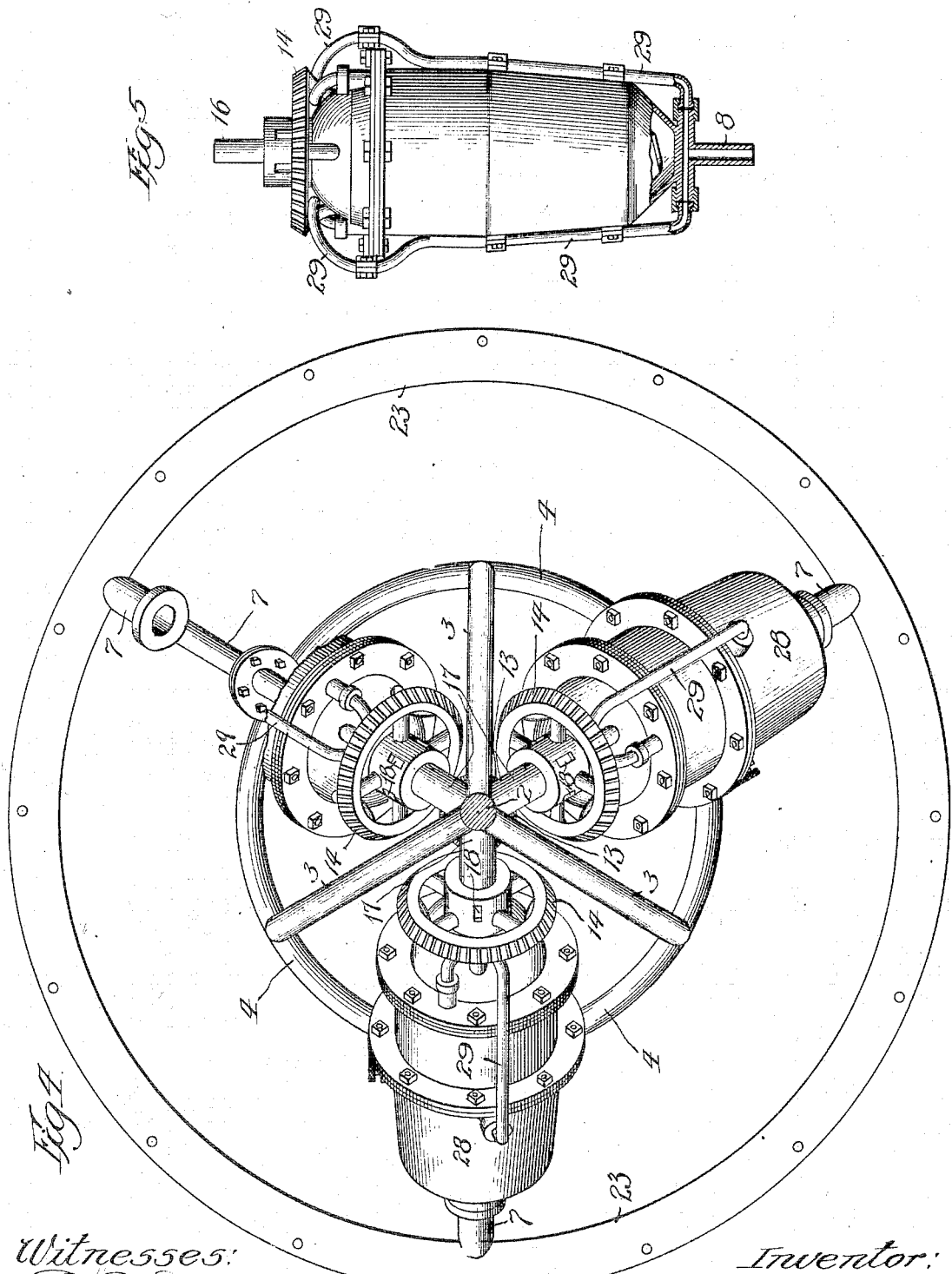

UNITED STATES PATENT OFFICE.

ROBERT J. DAVIDSON, OF CHICAGO, ILLINOIS.

ROTARY ENGINE.

1,078,539.        Specification of Letters Patent.        Patented Nov. 11, 1913.

Application filed March 4, 1910. Serial No. 547,350.

*To all whom it may concern:*

Be it known that I, ROBERT J. DAVIDSON, citizen of the United States, residing at Chicago, in the county of Cook and State of Illinois, have invented a certain new and useful Improvement in Rotary Engines, of which the following is a full, clear, concise, and exact description, reference being had to the accompanying drawings, forming a part of this specification.

My invention relates to rotary engines and in its preferred form may be used as a motor, an air or gas compressor and a rotary vacuum pump. I will generally describe the engine of my invention when employed as a driving motor and will thereafter set forth the manner in which it may be adapted to its alternate purposes.

The engine of my invention includes one or more cylinders having inclined individual axes of rotation, and while rotating about their individual axes also rotating bodily about a central axis which is desirably vertically disposed. The axis that is desirably vertically disposed pertains to a tubular shaft formed in alined sections, the lower one of which is stationary while the upper one is rotatable, the bore of the sectional or composite shaft serving as a fluid duct, to which end the shaft is sealed where its sections abut to prevent passage of the fluid through the space or crack between the abutting ends of the shaft sections. The lower shaft section constitutes a bearing for the hub of a bracket that is provided at its portions more remote from the stationary shaft section with inclined bearings for the cylinders, these bearings being located in inclined alinement with bearings for the upper ends of the cylinders that are carried by and bodily rotate with the upper or revoluble section of the aforesaid composite shaft. The supporting bracket is desirably provided with a hollow interior which is in communication with the bore of the composite shaft and is also in communication with the interior of the cylinders, whereby fluid may pass to and from the engine cylinders while they are rotating about their individual axes and while they together rotate about the axis of the composite shaft.

I will explain my invention more fully by reference to the accompanying drawings showing the preferred embodiments thereof, in which—

Figure 1 is a sectional elevation of an engine constructed in accordance with the invention, one operating cylinder only, however, being shown, it being understood that others may be supplied, this figure also showing the position of the liquid in the cylinder when the engine is in full operation by the nearly perpendicular dotted lines which mark about where its surfaces that are not in contact with its solid parts would be when the engine is traversing the position here shown; Fig. 2 is a view on line 2 2 of Fig. 1; Fig. 3 is an exterior view of an engine cylinder entering into the construction of my invention; Fig. 4 is a plan view of the engine cylinder supporting bracket and the engine cylinders supported by the bracket together with parts in immediate association with the engine cylinders and supporting bracket, a part of the housing being omitted and certain parts of the engine structure being broken away in order that details of construction may be revealed; and Fig. 5 is a view of a modified engine cylinder that may enter into the construction of my invention.

Like parts are indicated by similar characters of reference throughout the different figures.

The piping through which fluid finds passage between the engine cylinders and the exterior of the engine structure includes a portion that is preferably vertically disposed and which is formed in a stationary section 1 and a revoluble section 2 in alinement with section 1. A plurality of radiating pipe branches 3 extend from the upper portion of the revoluble pipe section 2, the bores of the sections 2 and 3 communicating. The lower ends of the branches 3 join the annular pipe 4, the bores of the branches 3 communicating with the bore of the annular pipe 4, the center of the annulus formed by the pipe 4 being included within the axis of the composite tubular shaft or pipe 1, 2. The annulus 4 has a plurality of spokes 5 that are merged in a hub 6 surrounding and free to rotate upon the stationary composite tubular shaft section 1. Radially projecting pipe sections 7, equal in number to the number of engine cylinders, are carried by the annular pipe 4 whose bore communicates with the bores of the pipe extensions 7. The outer ends of the pipe sections 7 are inturned, the axes of the inturned portions of said pipe extensions 7 converging to a point located within the axis of the composite tubular shaft 1, 2, the converging axes of the inturned portions of the pipe extensions 7 constituting the axes of the rotating cylinders of the engine. The free ends of the inturned portions of the pipe extensions 7 are enlarged so as to constitute bearings that receive the tubular extensions 8 of the engine cylinder structure, suitable stuffing boxes 9 being employed to prevent the escape of fluid between the extensions 8 and their cylindrical seats in the free end portions of the pipe extensions 7. Fluid thus may find passage between the interiors of the engine cylinders and the exterior pipe 10 by way of the stationary pipe section 1 constituting a pipe continuation of the pipe section 10, the revoluble pipe section 2, in multiple through the bores of the branches 3, the annular pipe 4, in multiple through the pipe extensions 7, and finally the hollow engine cylinder extensions 8. In order to prevent the escape of fluid through the crack at the abutting ends of the pipe sections 1 and 2, I provide a stuffing box that includes a sleeve section 11 and two glands 12 intervening between the pipe sections 1 and 2 and the tubular portion 11. The sleeve element 11 is in fixed relation with the stationary tubular shaft section 1 and carries upon its upper end a bevel gear 13 in fixed relation therewith, said bevel gear being in mesh with a bevel gear 14 provided in connection with each engine cylinder with respect to which it is rigid and coaxial.

The upper end of the revoluble tubular shaft section 2 carries a pulley 15 or other means for enabling the transmission of power from the tubular shaft section 2 to the load that is to be operated by the engine when working as a motor or by which power is applied to said tubular shaft section when the engine is to be used as a compressor or pump. The upper ends of the engine cylinders are provided with extensions 16 that are in axial alinement with the extensions 9, the extensions 16 being journaled within bearings 17 that are in oblique alinement with the bearings that support the engine cylinder extensions 8, said bearings 17 being fixed with respect to the revoluble tubular shaft section 2. The engine cylinders are provided with ports 18 that communicate with a receiving space inclosed within a housing 19. These ports 18 constitute exhaust ports when the engine is used as a motor and admission ports when the engine is used as a pump or compressor. The space within the interior of the housing 19 has communication with the exterior by way of a pipe 20 which constitutes an exhaust pipe that may, if desired, be led to a condenser when the engine is used as a motor and which constitutes an admission pipe for air when the engine is to be used as a pump or compressor, in which case the engine cylinders are rotated by power externally applied to the element 15 fixed with respect to the tubular shaft section 2. If the engine is used as a vacuum pump, the receiver is obviously attached to the pipe 20. The housing or dome 19 has a removable cap 21 by which access to the mechanism housed by the dome may be had. The dome 19 has an insetting flange 22 that rests upon an outsetting flange 23 of a base which seals the bottom of the dome, the insetting flange 22 and the outsetting flange 23 constituting a very convenient means for permitting of the assemblage of the dome and its base by means of threaded bolts. An outsetting flange 24 is also provided upon the base of the dome to enable said base to be readily secured to a suitable foundation. The central portion of the base has a conical part 25 which serves to direct water of condensation or other liquid from the tube 1 into an annular space 26 with which a draw off cock 27 communicates.

I have thus far specifically described many novel features of a rotary engine construction which may be used in connection with engine cylinder mechanism of a variety of designs, and while I prefer the novel engine cylinder mechanism which I have illustrated and will presently specifically describe, I do not wish to be limited thereto in all embodiments of the invention.

Each engine cylinder mechanism which I have illustrated in the form of the invention shown in Figs. 1 to 4 inclusive includes an external jacket 28 in communication at one end with the corresponding extension 3 and at the other end with pipes 29 that are carried to the top of the engine cylinder with a space 30 separated from the space jacketed by the jacket 28 by means of the cylindrical element 31. A spiral channel 32, formed by a spiral 33 having fluid tight connection with a surrounding casing 34, is in communication with the space 30 at its lower end and with the ports 18 at its upper end, conical perforated screens or baffle plates 35 intervening between the ports 18 and the spiral passageway 32. The spiral wall 33 has a bore 37 coaxial with the spiral and extending along its length. Some suitable liquid, or some suitable material that may be turned into a liquid, is inserted within the space 30 and the communicating spiral passageway to a suitable level. Assuming that the engine is operated as a motor, steam or other expansive gas is passed through the pipe 10, the tubular shaft 1, 2, the multiply related branch pipes 3, the annular pipe 4, the multiply related pipe extensions 7, the tubular extensions 8, the space jacketed by the jacket 28, the multiply related pipes 29, to the space 30, thence through the lower end of the spiral passageway 32, thereby occasioning such movement of the liquid within the spiral that the rotation of the structure terminating in the bearing elements 8 and 16 results, the baffle plates 35 preventing the egress of the liquid through the ports 18 while permitting escape of the steam through said ports. As the engine cylinder elements rotate about their individual axes, the bevel gears 14 are positively driven so as to rotate upon the bevel pinion 13 as a track, thereby forcing the bodily rotation of the engine cylinder elements about the axis of the composite tubular shaft 12, the section of the shaft 2 thereby being rotated to transmit power to the load driving pulley or element 15. The liquid finds a ready return through the bore 37 from the spiral passage. If the engine is to be used as a compressor or air pump, the shaft 2 is driven by torque applied at 15 in a direction reverse to that in which it is driven when the engine is employed as a motor. Vent cocks 38 may be provided in communication with the space jacketed by the jacket 28 in order that the air displaced by the steam within said jacketing space may readily find exit. In the form of the invention illustrated in Fig. 5, the jacket 28 is omitted, the pipes 29 being in direct communication with the tubular extension 8 instead of by way of a jacketed space.

Each spiral passageway is increased in size as it approaches the top so as to provide for steam expansion to enable the steam to be effective in the varying volumes it occupies. The engine, when working as a motor, is adapted to work on separate portions of the gas or steam in the spiral way, which portions are of varying volumes.

Considering the engine as operating as a motor, the higher the speed, the greater the centrifugal force upon the liquid. As a consequence, a series of steam traps is afforded in the spiral way, one in the bottom of each convolution of the spiral, and the steam in these traps ascends toward the composite tubular shaft 1, 2, and expands as it ascends owing to the decreasing pressure of the liquid thereupon, rotation of the spiral upon its axis resulting, whereby the gear 14 is rotated to travel around the track 13. A fresh supply of steam is admitted to the spiral way upon each revolution of the spiral way, this replenishment occurring when the entrance of the spiral way is unsealed, that is, is brought in the neighborhood of its lowermost position where the liquid is absent owing to the centrifugal action thereupon, supplemented by the pressure of live steam or gas upon the liquid within the space 30. The spiral wall that defines the spiral way is deeply inclined so as to afford larger trapping spaces for the steam or other expansive fluid than would be present if this spiral wall were more perpendicular to the axis of the spiral. In order to reduce the retarding resistance of the air upon the rapidly revolving parts within the housing 19, I maintain a partial vacuum within the housing by means of a condenser attached to the pipe 20, the action of the condenser being desirably supplemented by a vacuum pump.

While I have herein shown and particularly described the preferred embodiments of my invention, I do not wish to be limited to the precise details of construction shown, as changes may readily be made without departing from the spirit thereof, but

Having thus described my invention, I claim as new and desire to secure by Letters Patent the following:—

1. A rotary engine including a tubular shaft formed in abutting rotating and non-rotating sections; an engine element inclined with respect to said tubular shaft; a lower support rotatable about the axis of the tubular shaft and provided with a bearing for the lower end of said engine element; a bearing for the upper end of said engine element carried by the rotatable section of the tubular shaft; a track about the axis of the tubular shaft in gear connection with the engine element; and means for affording passage for fluid through both sections of the tubular shaft and between the same and the engine element.

2. A rotary engine including a rotatable tubular shaft element; an engine element inclined with respect to said tubular shaft element; a lower support rotatable about the axis of the tubular shaft element and provided with a bearing for the lower end of said engine element; a bearing for the upper end of said engine element carried by said tubular shaft element; a track about the axis of the tubular shaft element and in gear connection with the engine element; and means for affording passage for fluid through the bore of said tubular shaft element and between the same and the lower end of the engine element.

3. An engine including a casing; a second casing with a space intervening between it and the first casing, a spiral way being provided within the second casing in communication at one end with the space intervening between the two casings and at the other end with the exterior of the casings; liquid within the two casings; and means for effecting passage of fluid between the space between the two casings and the exterior of the engine, the spiral wall within the inner casing permitting communication between the central portion of this casing and the peripheral portions of this casing.

4. An engine including a casing; a second casing with a space intervening between it and the first casing, a spiral way being provided within the second casing in communication at one end with the space intervening between the two casings and at the other end with the exterior of the casings; liquid within the two casings; and means for effecting passage of fluid between the space between the two casings and the exterior of the engine, the spiral wall within the inner casing being discontinued at the central portion of the inner casing, thereby affording a longitudinal channel through the inner casing with which the spiral way is in communication.

5. An engine including a casing; a second casing with a space intervening between it and the first casing, an inclined spiral way being provided within the second casing in communication at one end with the space intervening between the two casings and at the other end with the exterior of the casings; liquid within the two casings; and means for effecting passage of fluid between the space between the two casings and the exterior of the engine, the spiral wall within the inner casing permitting communication between the central portion of this casing and the peripheral portions of this casing.

6. An engine including a casing; a second casing with a space intervening between it and the first casing, an inclined spiral way being provided within the second casing in communication at one end with the space intervening between the two casings and at the other end with the exterior of the casings; liquid within the two casings; and means for effecting passage of fluid between the space between the two casings and the exterior of the engine, the spiral wall within the inner casing being discontinued at the central portion of the inner casing, thereby affording a longitudinal channel through the inner casing with which the spiral way is in communication.

7. An engine including a casing; a second casing with a space intervening between it and the first casing, an inclined spiral way being provided within the second casing in communication at one end with the space intervening between the two casings and at the other end with the exterior of the casings; liquid within the two casings; means for effecting passage of fluid between the space between the two casings and the exterior of the engine, the spiral wall within the inner casing permitting communication between the central portion of this casing and the peripheral portions of this casing; and means whereby said casings and the inclosed spiral way are caused bodily to move about an axis with respect to which said spiral way is inclined.

8. An engine including a casing; a second casing with a space intervening between it and the first casing, an inclined spiral way being provided within the second casing in communication at one end with the space intervening between the two casings and at the other end with the exterior of the casings; liquid within the two casings; means for effecting passage of fluid between the space between the two casings and the exterior of the engine, the spiral wall within the inner casing being discontinued at the central portion of the inner casing, thereby affording a longitudinal channel through the inner casing with which the spiral way is in communication; and means whereby said casings and the inclosed spiral way are caused bodily to move about an axis with respect to which said spiral way is inclined.

9. An engine consisting of an inverted conical spiral wall, attached by a fluid tight juncture to the inside of an inner casing and thereby defining a spiral way between the successive convolutions thereof, said inner casing being open at both ends, and fastened securely within a bearing outer casing member and under a bearing cover member, a space intervening between the two casings, said space communicating through a swivel jointed passage with the fluid exterior of the engine and with the end of the spiral way nearest the bottom of the outer casing, the other end of said spiral way communicating through the space under the cover to the exhaust, a liquid contained in and partly filling the space between the two casings and in the spiral way and adapted to be so disposed therein by gravity and the inclined position of the axis of the engine and the pressure of the expansive fluid as to cause said engine to rotate on its axis by the action upon said spiral wall of said expansive fluid in passing successively through said space and spiral way and the liquid therein contained, substantially as described.

10. An engine consisting of an inverted conical spiral wall, attached by a fluid tight juncture to the inside of an inner casing and thereby defining a spiral way between the successive convolutions thereof, said inner casing being open at both ends and fastened securely within a bearing outer casing member, and under a bearing cover member, a space intervening between the two casings, said space communicating through a swivel jointed passage with the exterior of the engine and with the end of the spiral way nearest the bottom of the outer casing, the other end of said spiral way communicating through the space under the cover to the exhaust, a liquid contained in and partly filling the space between the two casings and in the spiral way, means for revolving the engine around another axis to which the axis of the engine is inclined to generate centrifugal force in the liquid, and means whereby the rotation of the engine causes said revolution of the engine; substantially as described.

11. An engine consisting of an inverted conical spiral wall, of two or more convolutions attached by a fluid tight juncture to the inside of an inner casing and thereby defining a spiral way of one or more convolutions between the successive convolutions of said spiral wall, said inner casing being open at both ends, and fastened securely within a bearing outer casing member and under a bearing cover member, a space intervening between the two casings, said space communicating through a swivel jointed passage with the exterior of the engine, and with the end of the spiral way, nearest the bottom of the outer casing, the other end of said spiral way communicating through the space under the cover to the exhaust, a liquid contained in and partly filling the space between the two casings and in the spiral way and adapted to be so disposed therein by gravity and the inclined position of the axis of the engine and the pressure of the expansive fluid as to cause said engine to rotate on its axis by the action upon said spiral wall of said expansive fluid in passing successively through said space and spiral way and the liquid therein contained, substantially as described.

12. An engine consisting of an inverted conical spiral wall, of two or more convolutions attached by a fluid tight juncture to the inside of an inner casing and thereby defining a spiral way of one or more convolutions between the successive convolutions of said spiral wall, said inner casing being open at both ends, and fastened securely within a bearing outer casing member and under a bearing cover member, a space intervening between the two casings, said space communicating through a swivel jointed passage with the exterior of the engine and with the end of the spiral way nearest the bottom of the outer casing, the other end of said spiral way communicating through the space under the cover to the exhaust, a liquid contained in and partly filling the space between the two casings and in the spiral way, means for revolving the engine around another axis to which the axis of the engine is inclined to generate centrifugal force in said liquid, and means whereby said rotation of said engine causes said revolution of said engine; substantially as described.

13. An engine consisting of an inverted conical spiral wall, attached by a fluid tight juncture to the inside of an inner casing and thereby defining a spiral way between the successive convolutions thereof, an axial hole through the successive convolutions of said spiral wall, said inner casing being open at both ends, and fastened securely within a bearing outer casing member and under a bearing cover member, a space intervening between the two casings, said space communicating through a swivel jointed passage with the exterior of the engine and with the end of the spiral way nearest the bottom of the outer casing, the other end of said spiral way communicating through the space under the cover to the exhaust, a liquid contained in and partly filling the space between the two casings and in the spiral way and adapted to be so disposed therein by gravity and the inclined position of the axis of the engine and the pressure of the expansive fluid as to cause said engine to rotate on its axis by the action upon said spiral wall of said expansive fluid in passing successively through said space and spiral way and the liquid therein contained, substantially as described.

14. An engine consisting of an inverted conical spiral wall attached by a fluid tight juncture to the inside of an inner casing and thereby defining a spiral way between the successive convolutions thereof, an axial hole through the successive convolutions of said spiral wall, said inner casing being open at both ends, and fastened securely within a bearing outer casing member, and under a bearing cover member, a space intervening between the two casings, said space communicating through a swivel jointed passage with the exterior of the engine and with the end of the spiral way nearest the bottom of the outer casing, the other end of said spiral way communicating through the space under the cover to the exhaust, a liquid contained in and partly filling the space between the two casings and in the spiral way, means for revolving the engine around another axis to which the axis of the engine is inclined to generate centrifugal force in said liquid and means whereby said rotation of said engine causes said revolution of said engine; substantially as described.

15. An engine consisting of an inverted conical spiral wall, of two or more convolutions attached by a fluid tight juncture to the inside of an inner casing and thereby defining a spiral way of one or more convolutions between the successive convolutions of said spiral wall, an axial hole through the successive convolutions of said spiral wall, said inner casing being open at both ends, and fastened securely within a bearing outer casing member and under a bearing cover member, a jointed passage with the exterior of the engine, and with the end of the spiral way nearest the bottom of the outer casing, the other end of said spiral way communicating through the space under the cover to the exhaust, a liquid contained in and partly filling the space between the two casings and in the spiral way and adapted to be so disposed therein by gravity and the inclined position of the axis of the engine and the pressure of the expansive fluid as to cause said engine to rotate on its axis by the action upon said spiral wall of said expansive fluid in passing successively through said space and spiral way and the liquid therein contained, substantially as described.

16. An engine consisting of an inverted conical spiral wall, of two or more convolutions attached by a fluid tight juncture to the inside of an inner casing and thereby defining a spiral way of one or more convolutions between the successive convolutions of said spiral wall, an axial hole through the successive convolutions of said spiral wall, said inner casing being open at both ends, and fastened securely within a bearing outer casing member and under a bearing cover member, a space intervening between the two casings, said space communicating through a swivel jointed passage with the exterior to the engine, and with the end of the spiral way nearest the bottom of the outer casing, the other end of said spiral way communicating through the space under the cover to the exhaust, a liquid contained in and partly filling the space between the two casings and the spiral way, means for revolving the engine around another axis to which the axis of the engine is inclined to generate centrifugal force in said liquid and means whereby said rotation of said engine causes said revolution of said engine; substantially as described.

In witness whereof, I hereunto subscribe my name this nineteenth day of February, A. D., 1910.

ROBERT J. DAVIDSON.

Witnesses:
G. L. CRAGG,
R. E. ATHERTON.